United States Patent
Xie et al.

(10) Patent No.: US 8,441,910 B1
(45) Date of Patent: May 14, 2013

(54) SYSTEM AND METHOD OF ADJUSTING GAIN AND OFFSET LOOPS IN DATA STORAGE SYSTEM

(75) Inventors: Jie Xie, Longmont, CO (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 714 days.

(21) Appl. No.: 12/435,292

(22) Filed: May 4, 2009

Related U.S. Application Data (60) Provisional application No. 61/050,800, filed on May 6, 2008.

(51) Int. Cl.
*G11B 7/00* (2006.01)

(52) U.S. Cl.
USPC ............. 369/124.01; 369/47.15; 369/53.35; 369/124.1

(58) Field of Classification Search ............. 369/124.01, 369/124.1, 124.11, 53.35, 53.1, 53.11, 53.2, 369/44.29, 47.25, 107, 47.15
See application file for complete search history.

(56) References Cited

U.S. PATENT DOCUMENTS

| | | | |
|---|---|---|---|
| 6,621,863 B1 * | 9/2003 | Ido ............................ | 375/232 |
| 6,680,887 B2 * | 1/2004 | Shihara et al. ............. | 369/44.32 |
| 6,754,145 B1 * | 6/2004 | Shimamoto et al. ........ | 369/44.32 |
| 6,882,609 B2 * | 4/2005 | Williams et al. ............ | 369/47.48 |
| 7,221,638 B2 * | 5/2007 | Rapp .......................... | 369/124.15 |
| 7,254,100 B2 * | 8/2007 | Ogura ......................... | 369/47.24 |
| 7,446,685 B1 * | 11/2008 | Kikugawa et al. ............ | 341/142 |
| 2006/0133252 A1 * | 6/2006 | Rapp ........................... | 369/59.22 |

OTHER PUBLICATIONS

"Blu-ray Disc White Pape 1.0 Physical Format Specifications for BD-ROM", Jan. 2005, pp. 1-32.
Jaekyun Moon et al. "Performance Comparison of Detection Methods in Magnetic Recording", IEEE Transactions on Magetics, vol. 26, No. 6, Nov. 1990, pp. 1-18.

* cited by examiner

*Primary Examiner* — Thomas Alunkal (57) ABSTRACT

In one embodiment the present invention includes a qualification circuit that controls a read channel in a data storage device. The qualification circuit includes a first circuit and a second circuit. The first circuit receives a first signal and generates a second signal based on a signal quality of the first signal. The second circuit receives the second signal, an envelope-derived error signal resulting from performing envelope derived error detection, and a decision-aided error signal resulting from performing decision aided error detection. The second circuit modifies the envelope-derived error signal and the decision aided error signal according to the second signal. The second circuit generates a control signal that controls the read channel according to the envelope-derived error signal and the decision-aided error signal having been modified.

16 Claims, 9 Drawing Sheets

FIG. 1

Qualification circuit 100

FIG. 2

Threshold Calculation 110

SYSTEM AND METHOD OF ADJUSTING GAIN AND OFFSET LOOPS IN DATA STORAGE SYSTEM

CROSS REFERENCE TO RELATED APPLICATIONS

The present application claims priority to U.S. Provisional Application No. 61/050,800 for "Combining Decision-Aided Error and Envelope-Derived Error for Gain and Offset Loops" filed May 6, 2008, the contents of which is incorporated herein by reference in its entirety.

BACKGROUND

The present invention relates to read channels in data storage devices, and in particular, to controlling a read channel dynamically based on both decision-aided error and envelope-derived error.

Unless otherwise indicated herein, the approaches described in this section are not prior art to the claims in this application and are not admitted to be prior art by inclusion in this section.

In optical data storage read channels, an electrical signal, often called RF or HF, is generated by a photo detector. A gain loop is used to amplify the RF signal to full dynamic range of the analog to digital converter (ADC). An offset loop is used to compensate for low frequency DC drifts. The error signal driving these two loops can be envelope-derived error (EE) and decision-aided error (DE).

Regarding EE, an envelope detector may be used to detect top and bottom envelopes of the ADC output. The gain error can be measured as the distance between the top and bottom envelopes in reference to the desired amplitude; the offset error can be measured as mean of the top and bottom envelope in reference to zero.

Regarding DE, a decision can be made by a slicer that follows a limit equalizer. An example can be seen in the white paper "Blu-ray Disc: Physical Format Specifications for BD-ROM" dated January 2005. Assuming that decisions are sufficiently accurate, the decision convolved with the target should match the equalizer output, therefore their difference reflects gain and offset errors.

(Further regarding decision-aided error, decisions can be generated data detectors other than a slicer after a limit equalizer: e.g., a slicer without a limit equalizer, fixed-delay tree search detector, or a Viterbi detector after a finite impulse response (FIR) filter, etc. For an example of the fixed-delay tree search detector, see J. Moon and R. L. Carley, "Performance comparison of detection methods in magnetic recording", IEEE Transactions on Magnetics, Volume 26, Issue 6, pp. 3155-3172 (1990).)

In a conventional channel, the decision to use EE or DE is a fixed selection specified by register settings.

SUMMARY

Embodiments of the present invention improve the performance of a read channel for a data storage device. According to an embodiment, the present invention includes a qualification circuit that controls a read channel in a data storage device. The qualification circuit includes a first circuit and a second circuit. The first circuit receives a first signal and generates a second signal based on a signal quality of the first signal. The second circuit receives the second signal, an envelope derived error signal resulting from performing envelope derived error detection, and a decision-aided error signal resulting from performing decision aided error detection. The second circuit modifies the envelope-derived error signal and the decision aided error signal according to the second signal. The second circuit generates a control signal that controls the read channel according to the envelope-derived error signal and the decision-aided error signal having been modified.

The first signal may correspond to a digital signal resulting from the data storage device reading a recording medium. The first signal may correspond to an equalization signal resulting from performing finite impulse response equalization on a digital signal resulting from the data storage device reading a recording medium. The first signal may correspond to a detector output signal resulting from performing Viterbi detection on a digital signal resulting from the data storage device reading a recording medium.

The first circuit may correspond to an accumulator circuit.

The qualification circuit may further include a third circuit that includes an absolute value calculation circuit and a threshold circuit. The absolute value calculation circuit receives the first signal and generates an absolute value of the first signal. The threshold circuit receives the absolute value and selectively generates a threshold output signal when the absolute value is below the threshold. The first circuit generates the second signal based on the threshold output signal.

The second circuit may include a counter, a weight calculation circuit, and at least one multiplier. The second circuit may include a counter, a threshold calculation circuit, and a switch. The second circuit may include a feedback multiplier, a weight calculation circuit, and at least one multiplier. The second circuit may include a feedback multiplier, a threshold calculation circuit, and a switch.

According to an embodiment, a system implements a read channel in a data storage device. The system includes an envelope-derived error signal generator, a decision-aided error signal generator, and a qualification circuit. The envelope-derived error signal generator receives a digital signal resulting from the data storage device reading a recording medium and generates an envelope-derived error signal from the digital signal. The decision-aided error signal generator receives the digital signal and generates a decision-aided error signal from the digital signal. The qualification circuit generates a control signal based on a signal quality of the digital signal. The control signal adjusts an analog signal read from the recording medium.

The qualification circuit may determine the signal quality of the digital signal according to an eye opening of a limit equalizer output signal related to the digital signal.

The system may further include one or both of an analog processing circuit and a loop filter circuit.

The decision-aided error signal generator may include a limit equalizer that receives the digital signal and that performs limit equalization of the digital signal to generate a limit equalizer output signal. The qualification circuit may determine the signal quality of the digital signal according to an eye opening of the limit equalizer output signal.

The qualification circuit may include a limit equalizer that receives the digital signal and that performs limit equalization of the digital signal to generate a limit equalizer output signal. The qualification circuit may determine the signal quality of the digital signal according to an eye opening of the limit equalizer output signal.

According to an embodiment, a method controls the operation of a read channel in a data storage device. The method includes generating an envelope-derived error signal from a digital signal resulting from the data storage device reading a recording medium. The method further includes generating a decision-aided error signal from the digital signal. The method further includes generating a control signal based on a signal quality of the digital signal. The control signal adjusts an analog signal read from the recording medium.

The method may further include performing limit equalization of the digital signal to generate a limit equalizer output signal. The control signal may be generated based on the limit equalizer output signal. The signal quality of the digital signal may be determined according to an eye opening of the limit equalizer output signal.

The method may further include generating weight factors, and generating the control signal from the decision-aided error signal modified by the first weight factor and the envelope-derived error signal modified by the second weight factor.

The method may further include special processing during channel start to use the envelope-derived error signal or to adjust the weights to favor the envelope-derived error signal.

The following detailed description and accompanying drawings provide a better understanding of the nature and advantages of the present invention.

DETAILED DESCRIPTION

Described herein are techniques for controlling a read channel in a data storage device. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

As discussed above, in a conventional channel, the decision to use EE or DE is a fixed selection specified by register setting. However, both EE and DE have shortcomings that make a fixed selection undesirable in certain circumstances.

One shortcoming of EE is that the envelopes are data-dependent; for example, a long run of 3T's has much smaller amplitude than a long run of 10T's. (In this context, "T" refers to a bit interval and nT refers to a string of consecutive bits, for example 10 "1"s or 10 "0"s for 10T.) The "envelope" of 3T is smaller than the envelope of 10T. When using EE, the gain loop therefore may amplify a long run of 3T's to an undesired large value.

DE may be used to avoid the above shortcoming of EE. But a shortcoming of DE is that there is no guarantee for correctness of the slicer output. For example, at the beginning of read, or during a dropout, or at other situations when loops such as the phase-locked loop have not converged, the slicer may make many erroneous decisions. In this case, the DE is not reliable, and EE is desired, because EE is always reliable despite gain, offset, or timing loop behavior.

Thus, when decisions are reliable, we prefer DE; otherwise we prefer EE. The present description describes a system and method that dynamically switches between EE and DE.

In brief, an embodiment of the present invention examines the output of a limit equalizer. The limit equalizer output is fed into a slicer for the DE calculation. The slicer makes a decision of "one" when the limit equalizer output is greater than or equal to zero, and makes a decision of "zero" when the limit equalizer output is less than zero. (The slicer may make other decisions in other embodiments.) When the incoming signal is at high quality, the eye opening of the limit equalizer output is large, and the slicer makes reliable decisions. Thus, DE is accurate. (In this context, "eye opening" means how far the limit equalizer output samples are away from zero.) When the incoming signal is at poor quality, eye opening of the limit equalizer output is small, and the slicer makes unreliable decisions. Hence, DE is inaccurate. A qualification circuit counts in L clock cycles, how many times (N) the absolute value of the limit equalizer output is below a programmable number M. If N is less than a programmable threshold, this means the signal quality is good and DE should be used. If N is greater than or equal to the threshold, this means the signal quality is bad and EE should be used.

More generally, a qualification circuit according to an embodiment of the present invention operates as a counter over a time period. For example, over a period of 100 bits, if a threshold is passed, the signal is classified as "bad" and EE should be used instead of DE.

Figure 1:
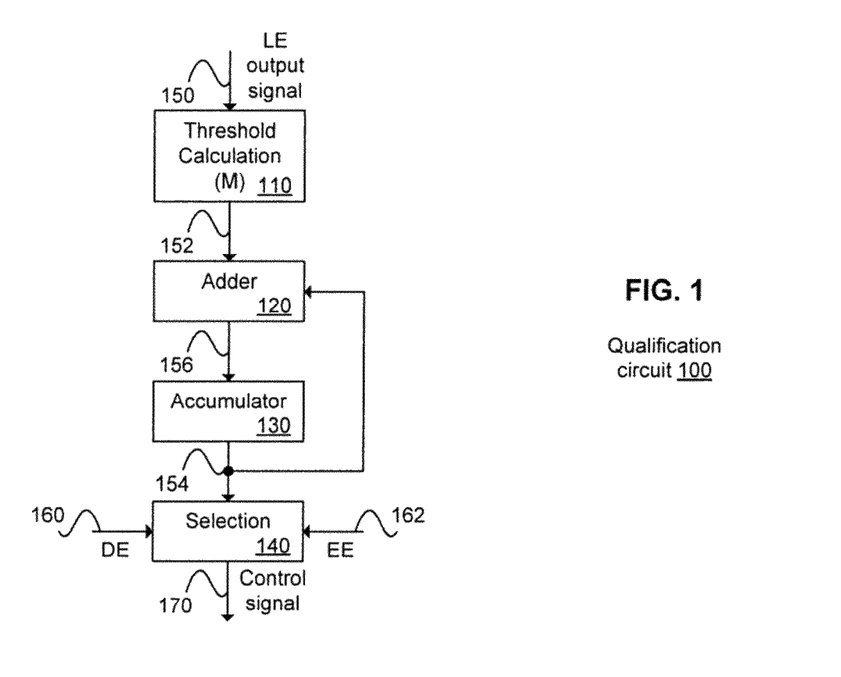
FIG. 1 is a block diagram of a qualification circuit according to an embodiment of the present invention.

FIG. 1 is a block diagram of a qualification circuit 100 according to an embodiment of the present invention. The qualification circuit 100 controls a read channel in a data storage device (see, e.g., FIGS. 4A-4C.) The qualification circuit 100 includes a threshold calculation circuit 110, an adder circuit 120, an accumulator circuit 130, and a selection circuit 140.

The threshold calculation circuit 110 receives the limit equalizer output signal 150 and selectively generates a threshold output signal 152. According to an embodiment, the threshold calculation circuit generates the threshold output signal 152 when an absolute value of the limit equalizer output signal 150 is below a threshold M. Further details of the threshold calculation circuit 110 can be seen in FIG. 2. The threshold calculation circuit 110 is coupled to the adder circuit 120.

The adder circuit 120 receives the threshold output signal 152 and an accumulation signal 154. The adder circuit 120 adds the threshold output signal 152 and the accumulation signal 154 to generate an adder output signal 156. The adder circuit 120 is coupled to the accumulator circuit 130.

The accumulator circuit 130 receives the adder output signal 156 and accumulates the adder output signal 156 to generate the accumulation signal 154. The accumulator circuit 130 is coupled to the adder circuit 120 and the selection circuit 140.

The selection circuit 140 receives the accumulation signal 154, a decision-aided error signal (DE) 160, and an envelope-derived error signal (EE) 162. The selection circuit 140 modifies the envelope-derived error signal 162 and the decision-aided error signal 160 according to the accumulation signal 154. The selection circuit 140 generates a control signal 170 that controls the read channel (see, e.g., FIGS. 4A-4C) according to the envelope-derived error signal 162 and the decision-aided error signal 160 having been respectively modified. (Further details of the selection circuit 140 can be seen in FIGS. 3A-3D.)

As a specific example in an optical data storage device, the limit equalizer output signal results from a read signal read from an optical medium. The limit equalizer output signal then indicates whether the read signal is a good signal or is a bad signal. This indication, over time, results in information that is accumulated by the accumulator 130. The selection circuit 140 then makes a determination according to the accumulation signal 154 to modify the DE signal 160 and the EE signal 162 as desired.

As another example, assume that read channel adjustment is proceeding according to DE. If the slicer begins making many decision errors, the gain and/or offset loops and/or timing loop show a disturbance because of the unreliable slicer decisions. In consequence, the limit equalizer output will reflect this situation, and the qualification circuit 100 will switch to EE to drive the offset and gain loops.

Figure 2:
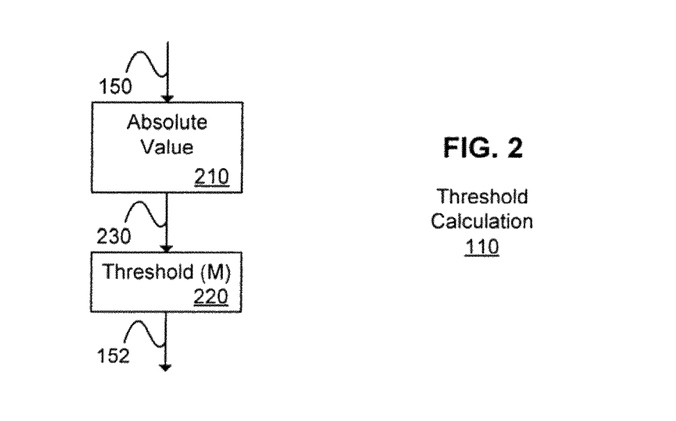
FIG. 2 is a block diagram of a threshold calculation circuit according to an embodiment of the present invention.

FIG. 2 is a block diagram showing details of the threshold calculation circuit 110 according to an embodiment of the present invention. The threshold calculation circuit 110 includes an absolute value calculation circuit 210 and a threshold circuit 220.

The absolute value calculation circuit 210 receives the limit equalizer output signal 150 and generates the absolute value 230 of the limit equalizer output signal 150. The absolute value calculation circuit 210 is coupled to the threshold circuit 220.

The threshold circuit 220 receives the absolute value 230 and selectively generates the threshold output signal 152. According to an embodiment, when the absolute value 230 is below the threshold M, the threshold circuit 220 generates the threshold output signal 152, and when the absolute value 230 is equal to or above the threshold M, the threshold circuit 220 does not generate the threshold output signal 152. According to another embodiment, when the absolute value 230 is above the threshold M, the threshold circuit 220 generates the threshold output signal 152, and when the absolute value 230 is equal to or below the threshold M, the threshold circuit 220 does not generate the threshold output signal 152.

Figure 3A:
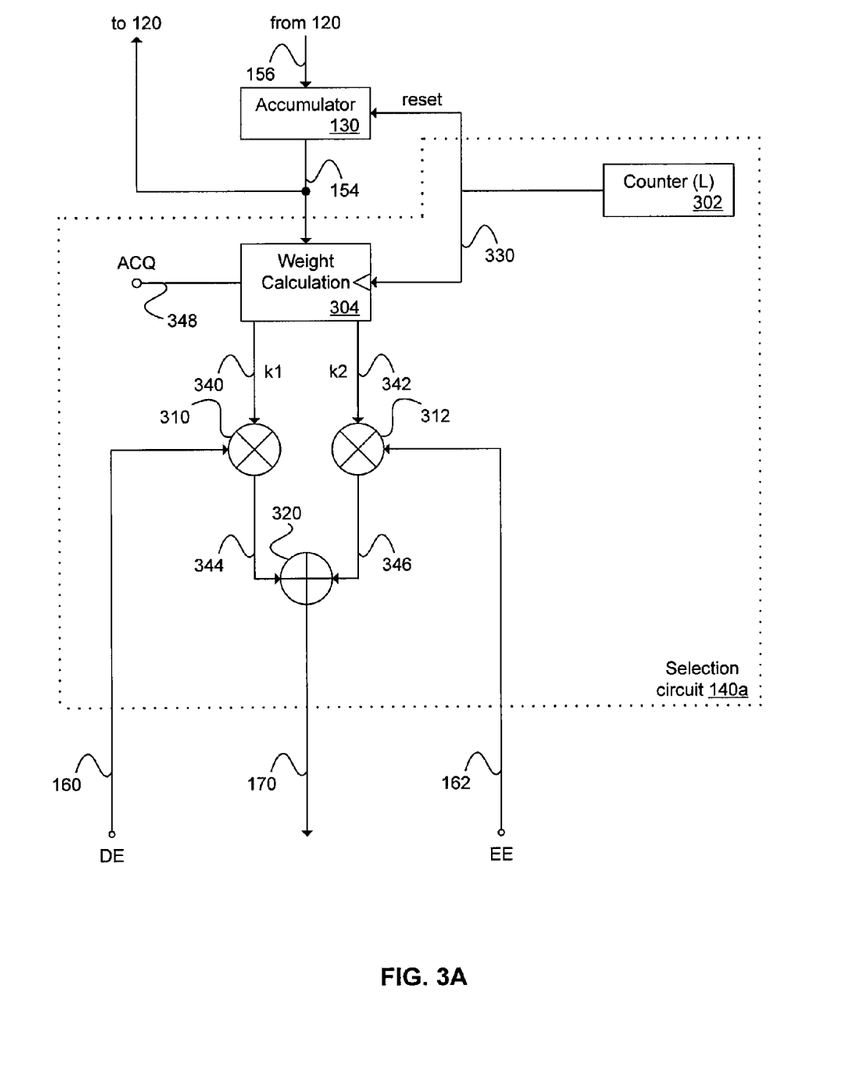
FIGS. 3A-3D are block diagrams of various embodiments of the selection circuit in the qualification circuit of FIG. 1.
Figure 3B:
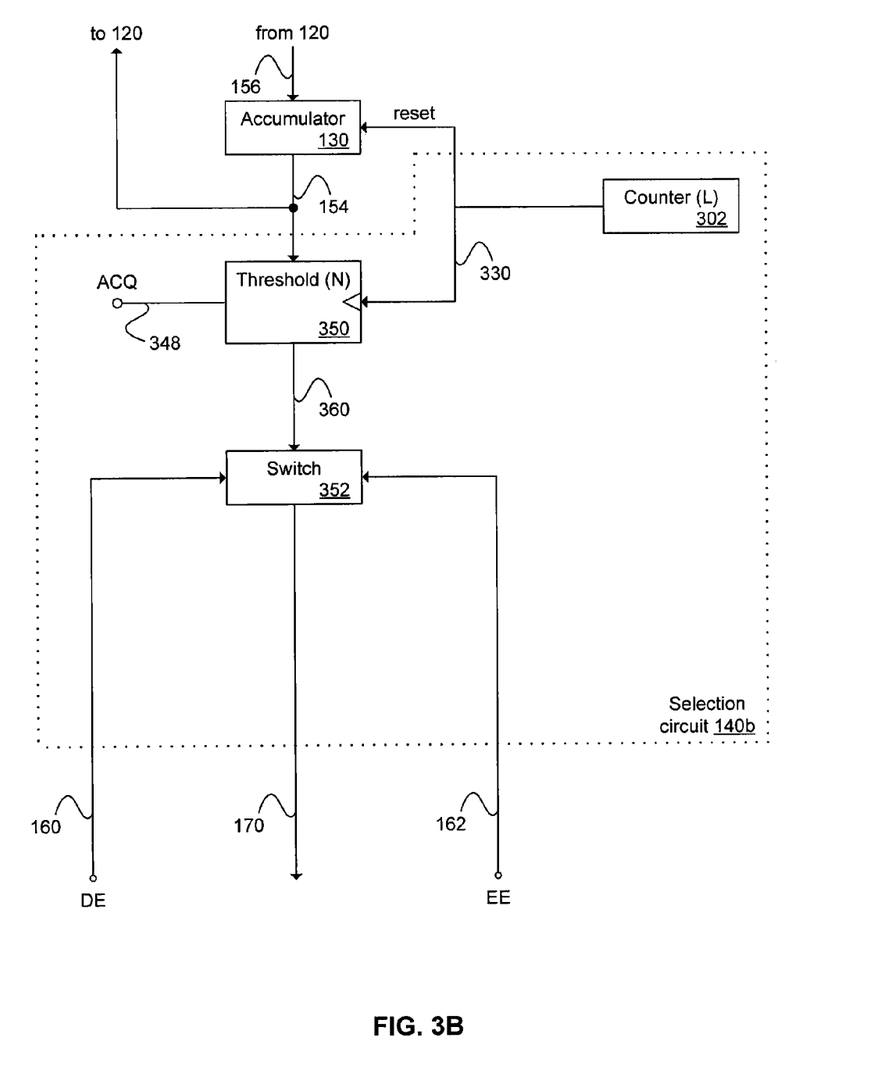
Figure 3C:
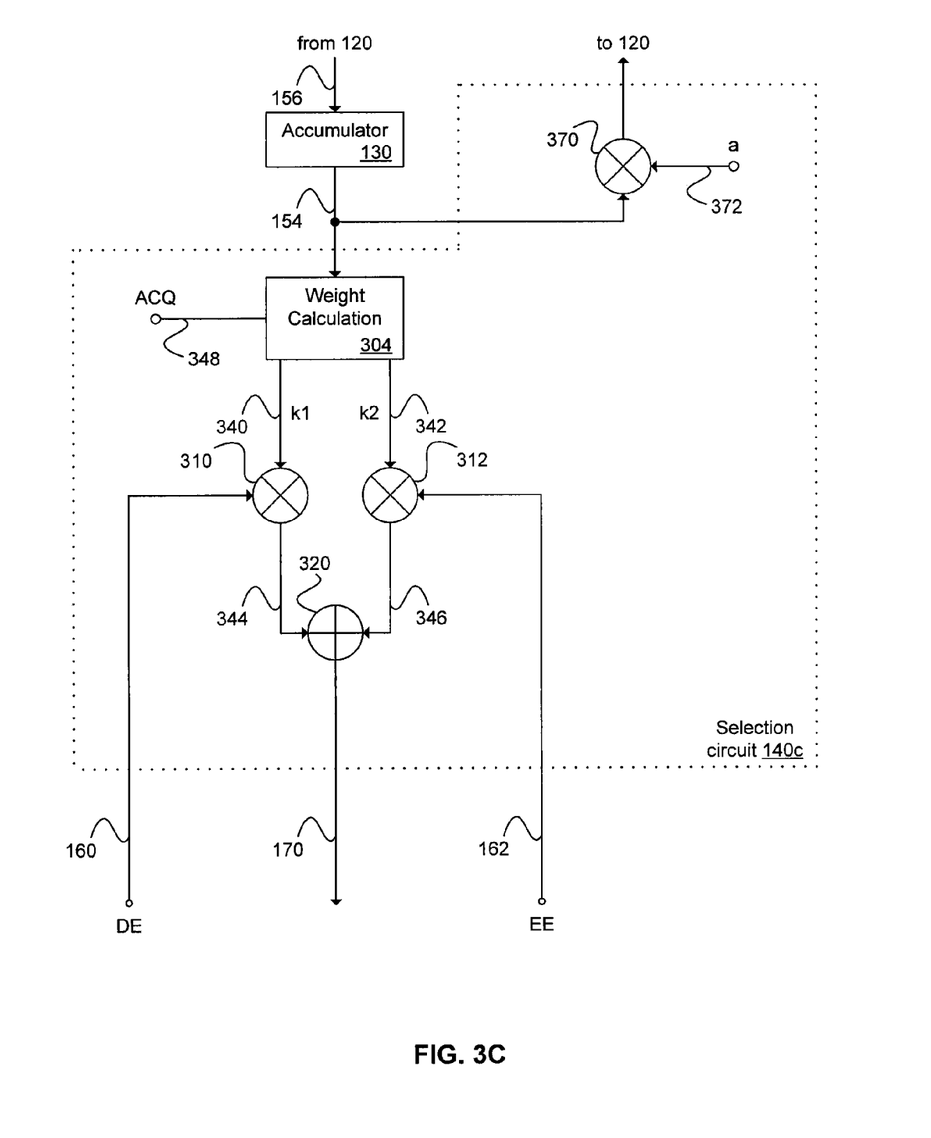

FIGS. 3A-3D are block diagrams of various embodiments of the selection circuit 140 in the qualification circuit 100 of FIG. 1. (FIGS. 3A-3D also include other components of the qualification circuit 100, such as the accumulator circuit 130, in order to show further relevant details.) FIG. 3A shows a selection circuit 140a, FIG. 3B shows a selection circuit 140b, and FIG. 3C shows a selection circuit 140c.

In FIG. 3A, the selection circuit 140a includes a counter 302, a weight calculation circuit 304, multipliers 310 and 312, and an adder 320. The counter 302 generates a counter output signal 330. The counter output signal 330 provides a clock signal to the weight calculation circuit 304 and provides a reset signal to the accumulator 130. The counter output signal 330 may be a pulse that the counter 302 generates every L clock cycles.

The weight calculation circuit 304 is clocked by the counter output signal 330. The weight calculation circuit 304 receives the accumulation signal 154 and generates a weight factor k1 340 and a weight factor k2 342 based on the accumulation signal 154. For example, when the accumulation signal 154 indicates that the read signal is bad, the weight calculation circuit 304 weights k2 more heavily than k1. The factors k1 and k2 may conform to a constraint such as k1+k2=1. The weight calculation circuit 304 is coupled to the multipliers 310 and 312.

The multiplier 310 receives the weight factor k1 340 and the decision-aided error signal 160, and multiplies the weight factor k1 340 and the decision-aided error signal 160 to generate a control signal portion 344. The multiplier 312 receives the weight factor k2 342 and the envelope-derived error signal 162, and multiplies the weight factor k2 and the envelope-derived error signal 162 to generate a control signal portion 346. The multipliers 310 and 312 are coupled to the adder 320.

The adder 320 receives the control signal portion 344 and the control signal portion 346, and adds the control signal portion 344 and the control signal portion 346 to generate the control signal 170. The control signal 170 is then a linear combination of EE and DE (namely, k1*DE+k2*EE, constraint on k1+k2=1). There are many ways to decide k1 and k2 that may be pursued in various embodiments. Generally, when the incoming signal is at poor quality, DE is less reliable so k1 is made small and k2 is made large. When the incoming signal is at good quality, DE is more reliable so k1 is made large and k2 is made small.

According to a further embodiment, the weight calculation circuit 304 may also be responsive to an acquisition (ACQ) signal 348 when the channel is started. At the start of the channel, the control loops may not have converged, so the signal quality is bad, and the data detectors are not expected to output correct decisions. Since it is known that the signal quality is bad, an embodiment does not need to rely on the qualification circuit 100 to judge signal quality. In such case, an ACQ mode that favors EE by increasing the weight k2 and/or decreasing the weight k1 may be entered. The ACQ signal 348 may be active for a defined period of time after the start of the channel, after seeking, after a defect, or in other situations in which the normal, continuous operation of the channel is disturbed.

In FIG. 3B, the selection circuit 140b is similar to the selection circuit 140a (see FIG. 3A) with some components replaced by a threshold calculation circuit 350 and a switch 352. (Alternatively, the selection circuit 140b may be viewed as implementing a special case of the selection circuit 140a with either [k1=1, k2=0] or [k1=0, k2=1].) For brevity, the description of elements similar to those of FIG. 3A is not repeated.

The threshold calculation circuit 350 is clocked by the counter output signal 330. The threshold calculation circuit 350 receives the accumulation signal 154 and selectively generates a switch control signal 360 when the accumulation signal 154 is below a threshold N. The threshold calculation circuit 350 is coupled to the switch 352.

The switch 352 receives the switch control signal 360 and selectively outputs, as the control signal 170, one of the decision-aided error signal 160 and the envelope-derived error signal 162 according to the switch control signal 360.

According to a further embodiment, the threshold calculation circuit 350 may also be responsive to the ACQ signal 348. When the channel is started, EE can be favored by the threshold calculation circuit 350 outputting the switch control signal 360 to control the switch 352 to select the envelope-derived error signal 162. The ACQ signal 348 may be active for a defined period of time after channel start. Alternatively, the ACQ signal 348 may be triggered upon start of the channel, and the threshold calculation circuit 350 may adjust the weights for a defined period of time after start channel.

In FIG. 3C, the selection circuit 140c is similar to the selection circuit 140a (see FIG. 3A) with some components replaced by a multiplier 370. For brevity, the description of elements similar to those of FIG. 3A is not repeated.

The multiplier 370 generally operates as a low pass filter to provide feedback of the accumulation signal 154 to the adder 120 (see FIG. 1). The multiplier 370 is controlled by a factor "a" 372 that may be a positive value less than or equal to 1.

Figure 3D:
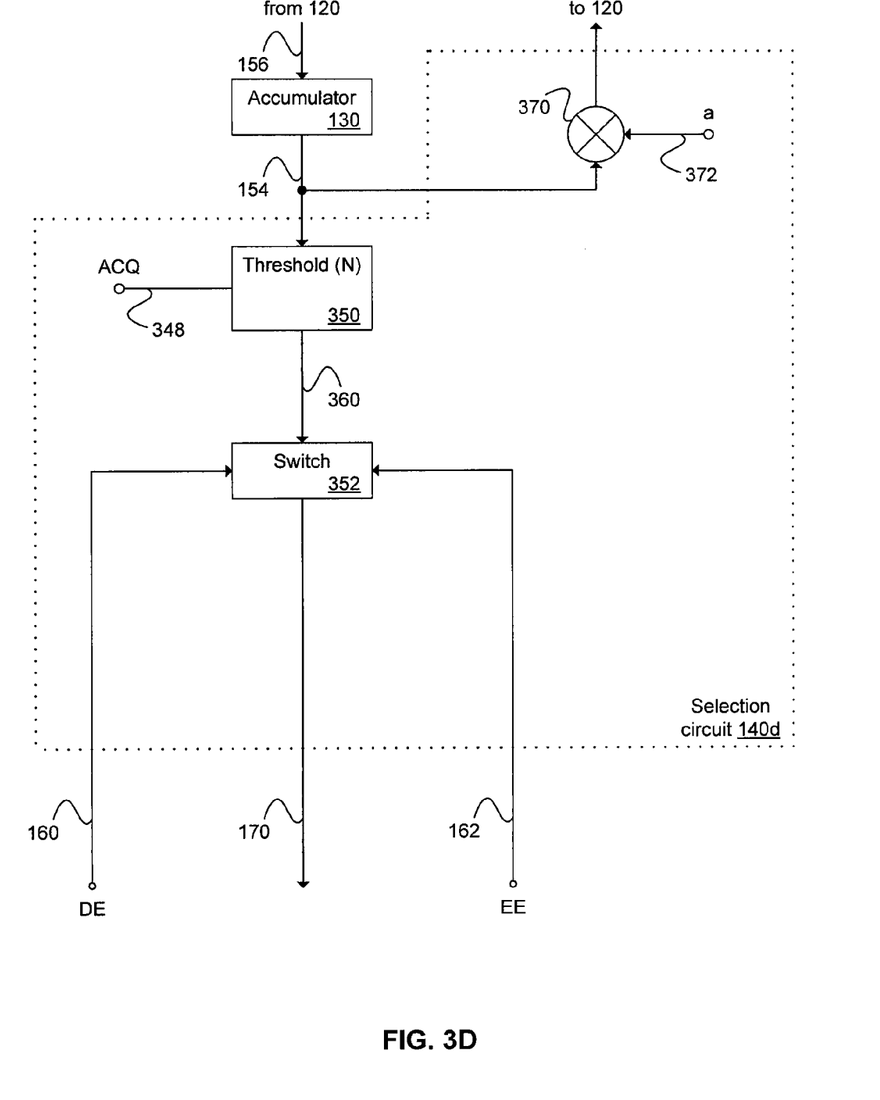

In FIG. 3D, the selection circuit 140d is similar to both the selection circuit 140b (see FIG. 3B) and the selection circuit 140c (see FIG. 3C). For brevity, the description of elements similar to those of FIGS. 3B and 3C is not repeated.

Figure 4A:
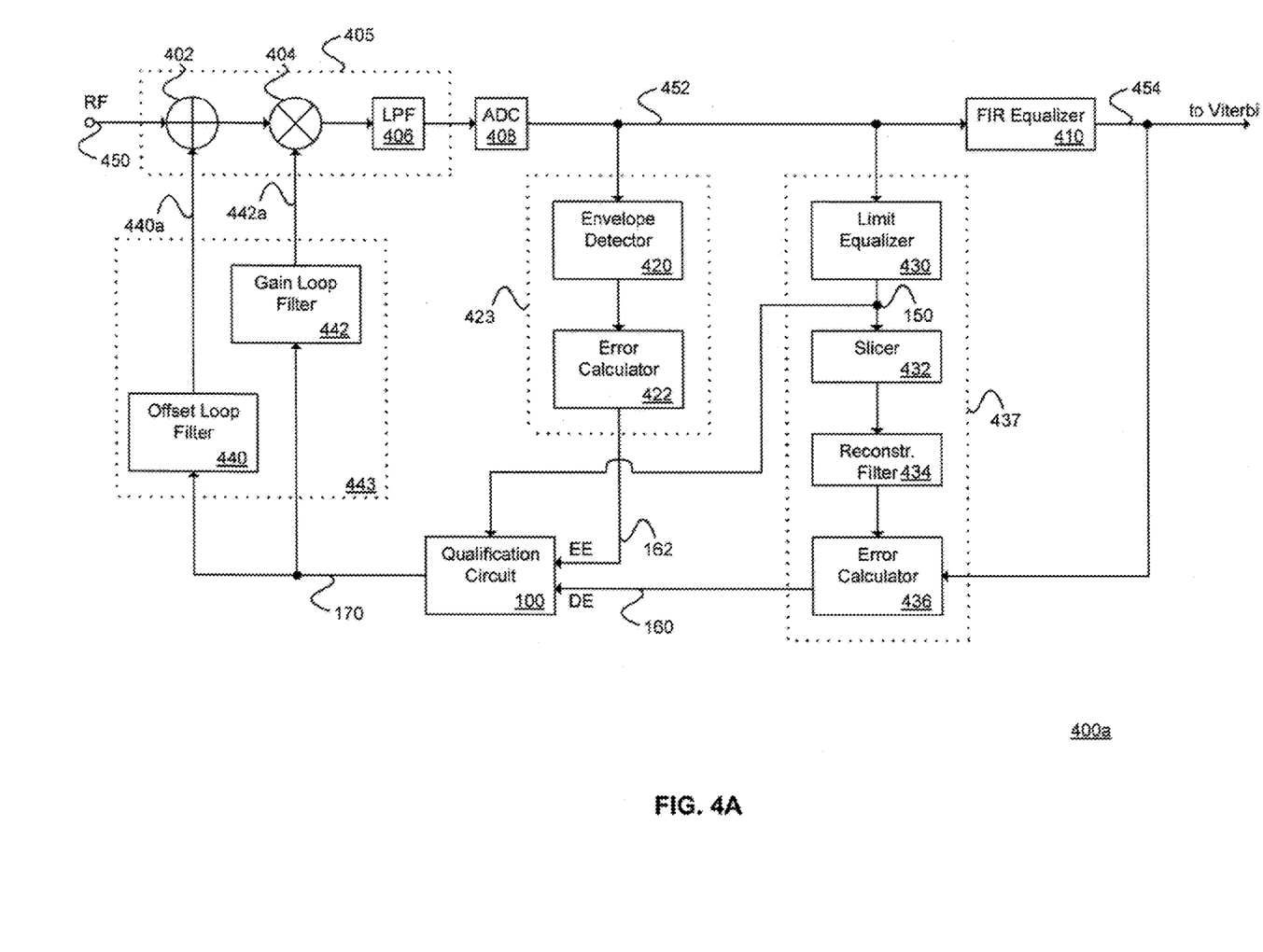
FIGS. 4A-4C are block diagrams of various embodiments of a read channel that includes the qualification circuit of FIG. 1.
Figure 4B:
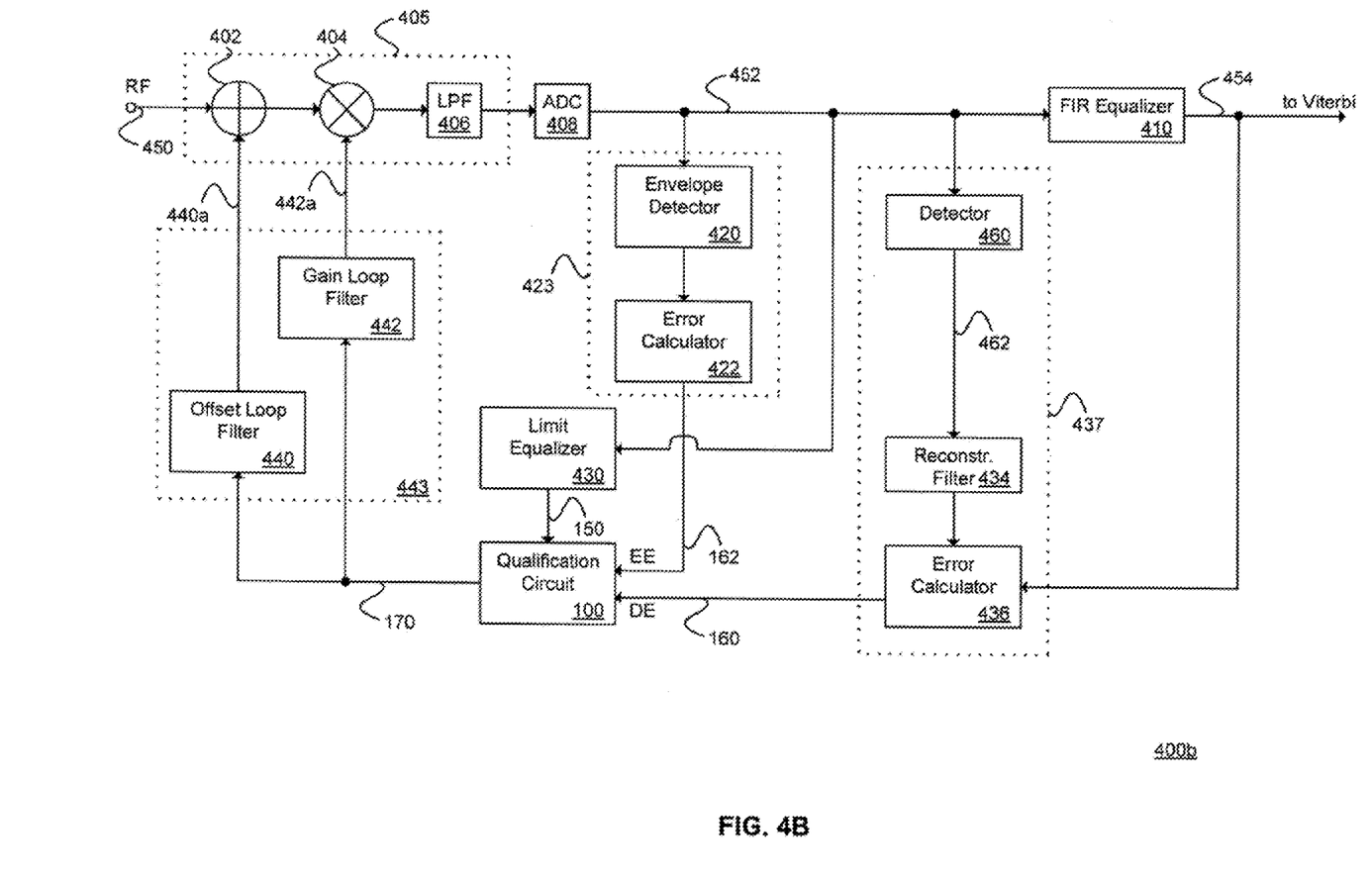
Figure 4C:
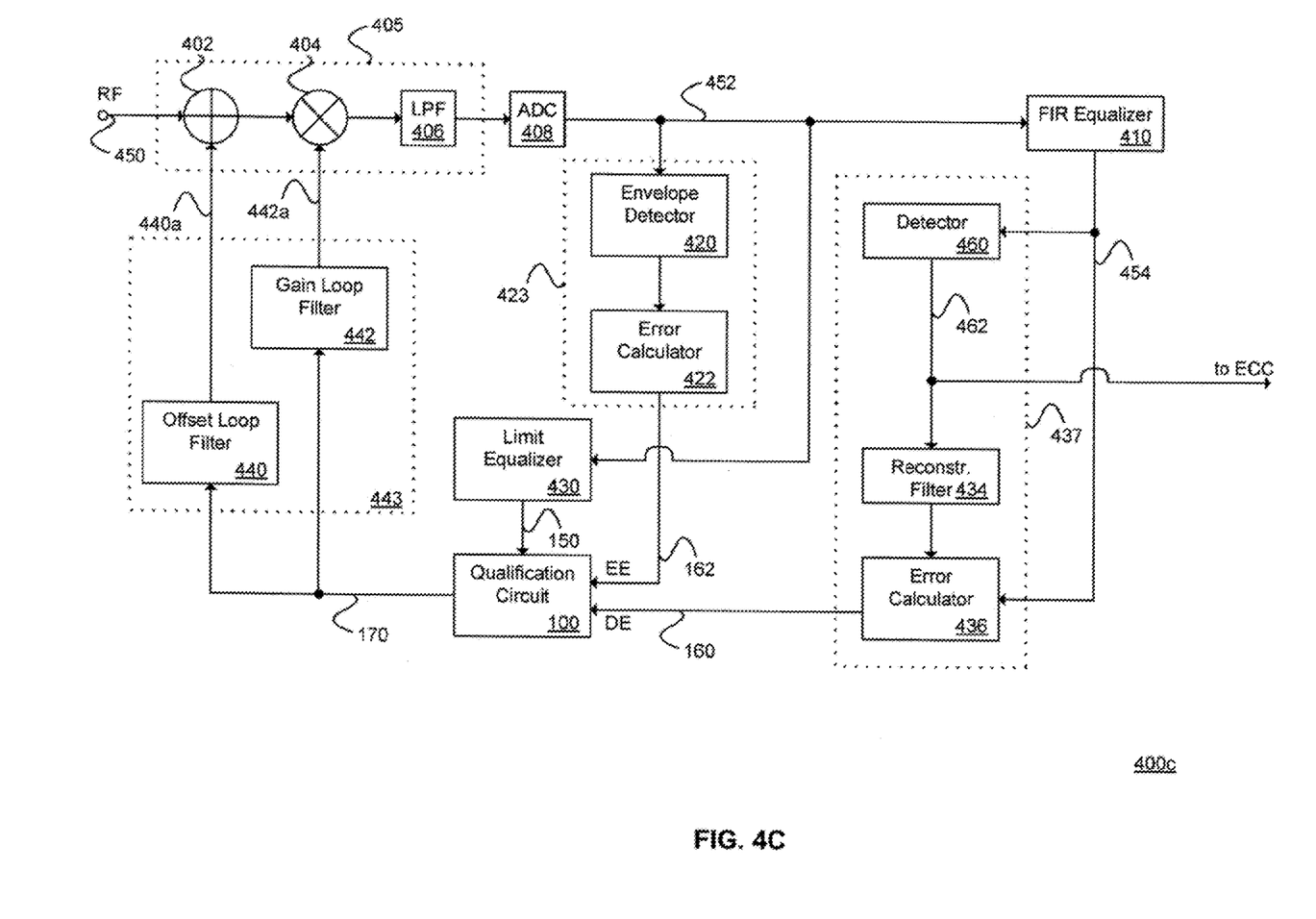

FIGS. 4A-4C are block diagrams of various embodiments of a read channel that includes the qualification circuit 100 of FIG. 1. FIG. 4A shows a read channel circuit 400a, FIG. 4B shows a read channel circuit 400b, and FIG. 4C shows a read channel circuit 400c. The read channel circuits may be implemented as part of a data storage device.

In FIG. 4A, the read channel circuit 400a includes an adder 402, a multiplier 404, and a low pass filter (LPF) 406, collectively referred to as an analog processing circuit 405. The read channel circuit 400a includes an analog to digital converter (ADC) 408 and a finite impulse response (FIR) equalizer 410. The read channel circuit 400a includes an envelope detector 420 and an error calculator 422, collectively referred to as an envelope-derived error (EE) signal generator 423. The read channel circuit 400a includes a limit equalizer 430, a slicer 432, a reconstruction filter 434, and an error calculator 436, collectively referred to as a decision-aided error (DE) signal generator 437. The read channel circuit 400a includes an offset loop filter 440 and a gain loop filter 442, collectively referred to as a loop filter circuit 443. The read channel circuit 400a includes the qualification circuit 100 (see FIG. 1).

The analog processing circuit 405 receives an analog RF signal 450 resulting from the data storage device reading a recording medium. The analog processing circuit 405 is controlled by an offset loop control signal 440a and a gain loop control signal 442a. More specifically, the adder 402 adjusts an offset of the analog signal 450 according to the offset loop control signal 440a, and the multiplier 404 adjusts a gain of the analog signal 450 according to the gain loop control signal 442a. The analog processing circuit 405 outputs an adjusted analog signal and is coupled to the low pass filter 406.

The low pass filter 406 performs low-pass filtering on the adjusted analog signal. The low pass filter 406 is coupled to the analog to digital converter 408.

The analog to digital converter 408 receives the adjusted analog signal and performs analog to digital conversion of the adjusted analog signal to generate a digital signal 452. The analog to digital converter 408 is coupled to the FIR equalizer 410, the envelope-derived error signal generator 423, and the decision-aided error signal generator 437.

The FIR equalizer 410 performs finite impulse response equalization on the digital signal 452 to generate a digital read signal 454. The FIR equalizer provides the digital read signal 452 to the DE signal generator 437. The digital read signal 454 may be provided to other components of the data storage system, such as a Viterbi decoder (not shown).

The EE signal generator 423 receives the digital signal 452 and generates the envelope-derived error signal 162 from the digital signal 452. More specifically, the envelope detector 420 detects an envelope of the digital signal 452 and generates an envelope detection signal based on the envelope of the digital signal 452. The error calculator 422 generates the envelope-derived error signal 162 from the envelope detection signal. The EE signal generator 423 is coupled to the qualification circuit 100.

The DE signal generator 437 receives the digital signal 452 and the digital read signal 454, and generates the decision-aided error signal 160 from the digital signal 452 and the digital read signal 454. More specifically, the limit equalizer 430 receives the digital signal 452 and performs limit equalization of the digital signal 452 to generate the limit equalizer output signal 150. The DE signal generator 437 provides the limit equalizer output signal 150 to the qualification circuit 100 and to the slicer 432. The slicer 432 receives the limit equalizer output signal 150 and slices the limit equalizer output signal 150 to generate a slicer output signal. The slicer output signal may be a digital bit stream, e.g., digital ones and zeros represented as +1 or −1. The reconstruction filter 434 receives the slicer output signal and convolves the slicer output signal with a target response to generate a digital signal similar to the output of FIR equalizer 410. The error calculator 436 receives the output of the reconstruction filter 434 and the digital read signal 454, and generates the decision-aided error signal 160 from the output of the reconstruction filter 434 and the digital read signal 454. The DE signal generator 437 is coupled to the qualification circuit 100.

The qualification circuit 100 generally operates as described above with reference to FIG. 1. In summary, the qualification circuit 100 generates the control signal 170 based on the digital signal 452, the envelope derived error signal 162 and the decision-aided error signal 160. The control signal 170 corresponds to a signal quality of the digital signal 452. More specifically, the qualification circuit 100 determines the signal quality of the digital signal 452 according to an eye opening of the limit equalizer output signal 150. The qualification circuit 100 is coupled to the loop filter circuit 443.

The loop filter circuit 443 receives the control signal 170 and generates the offset loop control signal 440a and the gain loop control signal 442a from the control signal 170. More specifically, the offset loop filter 440 receives the control signal 170 and generates the offset loop control signal 440a from the control signal 170. The gain loop filter 442 receives the control signal 170 and generates the gain loop control signal 442a from the control signal 170.

According to another embodiment, a Viterbi decoder may be used instead of the slicer 432.

In FIG. 4B, the read channel circuit 400b is similar to the read channel circuit 400a (see FIG. 4A) with some components replaced by a detector 460 and the limit equalizer 430 acting as part of the qualification circuit 100. For brevity, the description of elements similar to those of FIG. 4A is not repeated.

The detector 460 receives the digital signal 452 and generates a detector output signal 462 from the digital signal 452. The detector 460 may be a detector such as a Viterbi decoder, a slicer, a limit equalizer followed by a slicer, a fixed-delay tree search with decision feedback detector, a maximum likelihood sequence detector (MLSD), a partial response equalizer followed by a Viterbi decoder, a minimum noise power linear equalizer followed by a Viterbi decoder, a partial response equalizer followed by a symbol-by-symbol threshold detector, a peak detector with step-response equalization and a delay differentiator, a decision feedback equalizer, etc. The detector 460 is coupled to the reconstruction filter 434.

The reconstruction filter 434 receives the detector output signal 462 as its input, and otherwise operates as described above with reference to FIG. 4A.

In FIG. 4C, the read channel circuit 400c is similar to the read channel circuit 400b (see FIG. 4B) with the DE signal generator 437 receiving as its input the digital read signal 454 instead of the digital signal 452. Furthermore, the read channel circuit 400c provides as its output the detector output signal 462 instead of the digital read signal 454. The detector output signal 462 may be provided to other components of the data storage system, such as an error checking and correcting (ECC) circuit.

Variations on the embodiments of FIGS. 4A-4C may be made to result in additional embodiments, as desired. One such embodiment is that the qualification signal 100 makes its signal quality determination based on the signal quality of the digital signal 452. Another such embodiment is that the qualification signal 100 makes its signal quality determination based on the signal quality of the digital read signal 454. Yet another such embodiment is that the qualification signal 100 makes its signal quality determination based on the signal quality of the detector output signal 462. The eye opening of these signals 452, 454 and 462 may be detected as with the eye opening of the limit equalizer output signal 150. Note that in some of these embodiment variations, the limit equalizer 430 may be omitted. For example, the limit equalizer 430 may be omitted from a variation on FIG. 4B that uses the digital signal 452 in place of the limit equalization signal 150.

Figure 5:
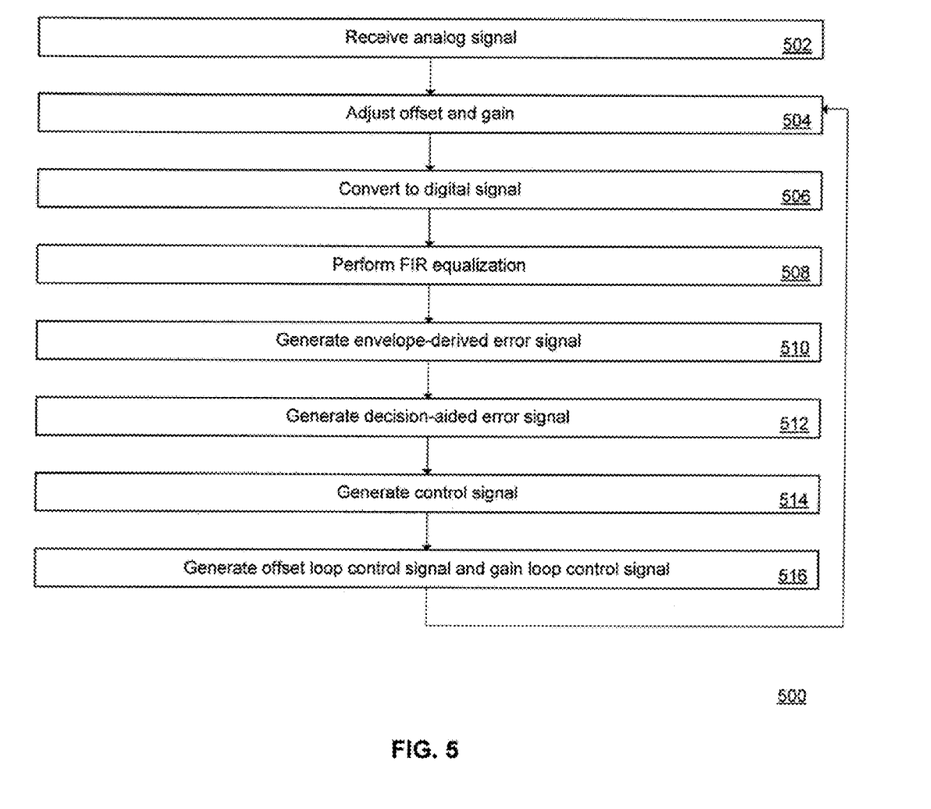
FIG. 5 is a flowchart of a method of operating a read channel in a data storage device according to an embodiment of the present invention.

FIG. 5 is a flowchart of a method 500 of operating a read channel in a data storage device according to an embodiment of the present invention. The method 500 may be performed by one or more of the systems 400 (see FIGS. 4A-4C).

In box 502, an analog signal is received. The analog signal results from the data storage device reading a recording medium. The analog signal may be the analog signal 450 (see FIG. 4A).

In box 504, an offset and a gain of the analog signal are adjusted according to an offset loop control signal and a gain loop control signal, respectively, to generate an adjusted analog signal. The analog processing circuit 405 (see FIG. 4A) may perform this adjustment.

In box 506, the adjusted analog signal is digitally converted to generate a digital signal. The analog to digital converter 408 (see FIG. 4A) may perform this conversion.

In box 508, finite impulse response equalization is performed on the digital signal to generate a digital read signal. The FIR equalizer 410 (see FIG. 4A) may perform this equalization.

In box 510, an envelope-derived error signal is generated from the digital signal. The EE signal generator 423 (see FIG. 4A) may generate the envelope-derived error signal.

In box 512, a decision-aided error signal is generated from the digital signal and the digital read signal. The DE signal generator 437 (see FIG. 4A) may generate the decision-aided error signal.

In box 514, a control signal is generated based on the digital signal, the envelope derived error signal and the decision-aided error signal. The control signal corresponds to a signal quality of the digital signal. The qualification circuit 100 (see FIG. 1) may generate the control signal.

More specifically, limit equalization may be performed on the digital signal to generate a limit equalizer output signal, and the control signal may generated based on the limit equalizer output signal. In such a case, the signal quality of the digital signal is determined according to an eye opening of the limit equalizer output signal.

Even more specifically, limit equalization may be performed on the digital signal to generate a limit equalizer output signal. Then, a threshold output signal may be selectively generated when an absolute value of the limit equalizer output signal is below a threshold. The threshold output signal and an accumulation signal may be added to generate an adder output signal. The adder output signal may be accumulated to generate the accumulation signal. A first weight factor and a second weight factor may be generated based on the accumulation signal. The first weight factor and the decision-aided error signal may be multiplied to generate a first control signal portion. The second weight factor and the envelope-derived error signal may be multiplied to generate a second control signal portion. Finally, the first control signal portion and the second control signal portion may be added to generate the control signal.

In box 516, the offset loop control signal and the gain loop control signal are generated from the control signal. The loop filter circuit 443 (see FIG. 4A) may generate the offset loop control signal and the gain loop control signal. Adjustment of the analog signal then occurs as described above with reference to box 504.

According to a further embodiment, the method 500 includes performing the channel start processing as described above with reference to FIGS. 3A-3D. This may involve increasing the weight of the EE portion in the control signal or selecting the EE signal as the control signal, for the period of channel start.

According to an embodiment, the present invention may be used to control the data channel in an optical data storage device. According to another embodiment, the present invention may be used to control the data channel in another type of data storage device, e.g., a magnetic data storage device.

Implementation Examples

For the following examples, assume an artificial digital video disc (DVD) waveform is generated that has 16 frames of random bits, then 10 frames of repeated 3T3T3T3T4T pattern. A glitch (simulating part of a fingerprint, for example) is generated in the random data portion, and a DC offset of 0.3 is added to the waveforms after the glitch. Three examples are discussed.

The first example uses only EE to drive the gain and offset loops. This example shows that the short T pattern was undesirably amplified. Thus, systems that use only EE are undesirable.

The second example uses only DE to drive the offset and gain loops. This example shows that during and after the glitch (around 0.9e4 bit intervals), many decision errors appear, and the gain and offset loops fail to maintain proper gain and offset. Thus, systems that use only DE are undesirable. The example further shows that during and after the glitch, the limit equalizer output shows a small eye opening.

The third example uses both EE and DE according to an embodiment of the present invention (see, e.g., the qualification circuit 100 of FIG. 1). This example shows that when the signal quality is poor (e.g., at the glitch), EE is used; and when signal quality was good, DE is used. The example shows that the gain and offset are properly maintained in the presence of the glitch. Furthermore, the example shows that at the start (corresponding to, e.g., channel start), EE may be used for a defined period with good results.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, one or more steps of methods or processes discussed above may be performed in a different order and still achieve desirable results. Based on the above disclosure and the following claims, other arrangements, embodiments, implementations and equivalents may be employed without departing from the scope of the invention as defined by the claims.

What is claimed is:

1. An apparatus including a qualification circuit that controls a read channel in a data storage device, the qualification circuit comprising:

a first circuit that receives a first signal, and that generates a second signal based on a signal quality of the first signal; and a second circuit coupled to the first circuit, that wherein the second circuit
    receives the second signal, an envelope-derived error signal resulting from performing envelope derived error detection, and a decision-aided error signal resulting from performing decision aided error detection,
    modifies the envelope-derived error signal and the decision aided error signal according to the second signal, and
    generates a control signal that controls the read channel according to (i) the envelope-derived error signal or (ii) the decision-aided error signal having been respectively modified.

2. The apparatus of claim 1, wherein the first signal comprises a digital signal resulting from the data storage device reading a recording medium.

3. The apparatus of claim 1, wherein the first signal comprises an equalization signal resulting from performing finite impulse response equalization on a digital signal resulting from the data storage device reading a recording medium.

4. The apparatus of claim 1, wherein the first signal comprises a detector output signal resulting from performing Viterbi detection on a digital signal resulting from the data storage device reading a recording medium.

5. The apparatus of claim 1, wherein the first circuit comprises an accumulator circuit.

6. The apparatus of claim 1, further comprising a third circuit, wherein the third circuit comprises:
    an absolute value calculation circuit that receives the first signal, and that generates an absolute value of the first signal; and
    a threshold circuit coupled to the absolute value calculation circuit, that wherein the threshold circuit
        receives the absolute value, and
        selectively generates a threshold output signal when the absolute value is below the threshold,
    wherein the first circuit generates the second signal based on the threshold output signal.

7. The apparatus of claim 1, wherein the second circuit comprises:
    a counter that generates a counter output signal;
    a weight calculation circuit locked by the counter output signal, wherein the weight calculation circuit receives the second signal, and generates a first weight factor and a second weight factor based on the second signal; and
    at least one multiplier coupled to the weight calculation circuit, wherein the at least one multiplier
        receives the first weight factor, the second weight factor, the envelope-derived error signal, and the decision aided error signal,
        multiplies the first weight factor and the decision-aided error signal to generate a first control signal portion,
        multiplies the second weight factor and the envelope-derived error signal to generate a second control signal portion, and
        combines the first control signal portion and the second control signal portion to generate the control signal,
    wherein the first circuit receives the counter output signal as a reset signal.

8. A system that implements a read channel in a data storage device, the system comprising:
    an envelope-derived error signal generator that receives a digital signal resulting from the data storage device reading a recording medium, and that generates an envelope-derived error signal from the digital signal;
    a decision-aided error signal generator that receives the digital signal and that generates a decision-aided error signal from the digital signal;
    a qualification circuit that generates a control signal based on a signal quality of the digital signal, the qualification circuit coupled to the envelope derived error signal generator and the decision-aided error signal generator, the qualification circuit having an input that receives a quality signal indicative of a signal quality of the digital signal, wherein the control signal adjusts an analog signal read from the recording medium; and
    a loop filter circuit, wherein the loop filter circuit comprises:
        an offset loop filter that receives the control signal, and that generates an offset loop control signal from the control signal, wherein the offset loop control signal adjusts an offset of the analog signal; and
        a gain loop filter that receives the control signal, and that generates a gain loop control signal from the control signal, wherein the gain loop control signal adjusts a gain of the analog signal.

9. The system of claim 8, wherein the qualification circuit determines the signal quality of the digital signal according to an eye opening of a limit equalizer output signal related to the digital signal.

10. The system of claim 8, wherein:
    the decision-aided error signal generator comprises:
        a limit equalizer that receives the digital signal and that performs limit equalization of the digital signal to generate a limit equalizer output signal; and
        an error calculator that receives the limit equalizer output signal and that generates the decision-aided error signal from the limit equalizer output signal, and
    wherein the qualification circuit determines the signal quality of the digital signal according to an eye opening of the limit equalizer output signal.

11. The system of claim 8, wherein:
    the decision-aided error signal generator comprises:
        a detector that receives the digital signal and that generates a detector output signal from the digital signal; and
        an error calculator that receives the detector output signal and that generates the decision-aided error signal from the detector output signal, and
    the qualification circuit comprises:
        a limit equalizer that receives the digital signal and that performs limit equalization of the digital signal to generate a limit equalizer output signal, wherein the qualification circuit determines the signal quality of the digital signal according to an eye opening of the limit equalizer output signal.

12. The system of claim 8, further comprising an analog processing circuit, wherein the analog processing circuit comprises:
    an adder that receives the analog signal, that is controlled by the offset loop control signal, and that adjusts the offset of the analog signal; and
    a multiplier that receives the analog signal, that is controlled by the gain loop control signal, and that adjusts the gain of the analog signal.

13. A method of operating a read channel in a data storage device, the method comprising:
    generating an envelope-derived error signal from a digital signal resulting from the data storage device reading a recording medium;
    generating a decision-aided error signal from the digital signal; and performing limit equalization of the digital signal to generate a limit equalizer output signal;
generating an accumulation signal based on the limit equalizer output signal;
generating a first weight factor and a second weight factor based on the accumulation signal; and
generating a control signal based on a signal quality of the digital signal, wherein the control signal adjusts an analog signal read from the recording medium,
wherein the control signal is generated from the decision-aided error signal modified by the first weight factor and the envelope-derived error signal modified by the second weight factor, wherein the signal quality of the digital signal is determined according to an eye opening of the limit equalizer output signal.

14. The method of claim 13, further comprising:
performing limit equalization of the digital signal to generate a limit equalizer output signal, wherein the control signal is generated based on the limit equalizer output signal, and wherein the signal quality of the digital signal is determined according to an eye opening of the limit equalizer output signal.

15. The method of claim 13, further comprising:
increasing the second weight factor and decreasing the first weight factor during channel start of the data storage device.

16. The method of claim 13, further comprising:
generating the control signal, during channel start, based on the envelope-derived error signal.

* * * * *

UNITED STATES PATENT AND TRADEMARK OFFICE
CERTIFICATE OF CORRECTION

PATENT NO. : 8,441,910 B1
APPLICATION NO. : 12/435292
DATED : May 14, 2013
INVENTOR(S) : Jin Xie et al.

Page 1 of 1

It is certified that error appears in the above-identified patent and that said Letters Patent is hereby corrected as shown below:

Title page at (75), Inventors, please replace "Jie Xie" with --Jin Xie--.

Signed and Sealed this
Eleventh Day of June, 2013

Teresa Stanek Rea
*Acting Director of the United States Patent and Trademark Office*